Aug. 11, 1959     P. I. D'ANTINI     2,899,214
SAFETY ASSEMBLY FOR PROTECTING DRIVERS AND
PASSENGERS OF AUTOMOTIVE VEHICLES
Filed Feb. 7, 1958     6 Sheets-Sheet 1

INVENTOR.
PASQUALE I. D'ANTINI,
BY
McMorrow, Berman + Davidson
ATTORNEYS.

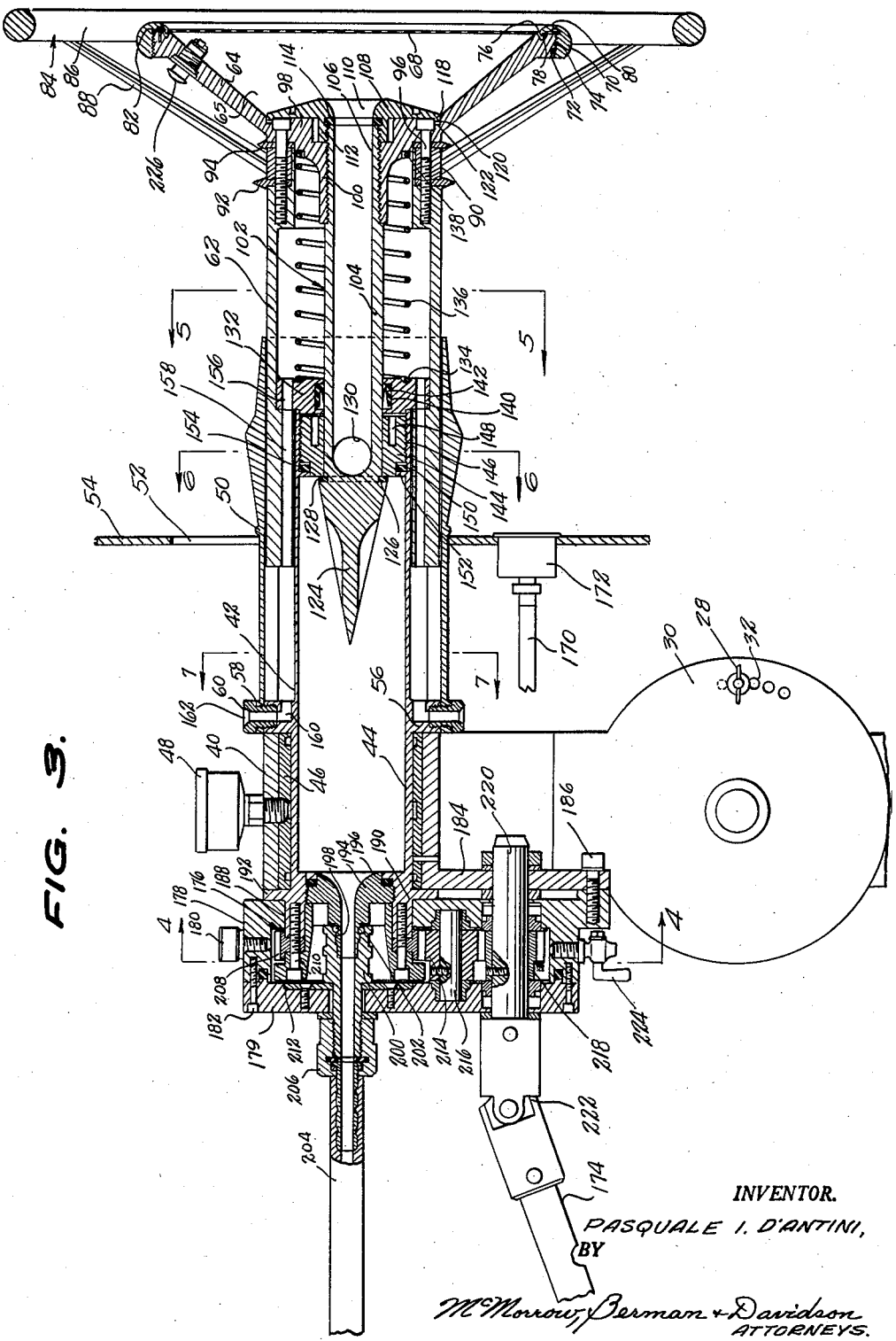

Aug. 11, 1959 P. I. D'ANTINI 2,899,214
SAFETY ASSEMBLY FOR PROTECTING DRIVERS AND
PASSENGERS OF AUTOMOTIVE VEHICLES
Filed Feb. 7, 1958 6 Sheets-Sheet 3
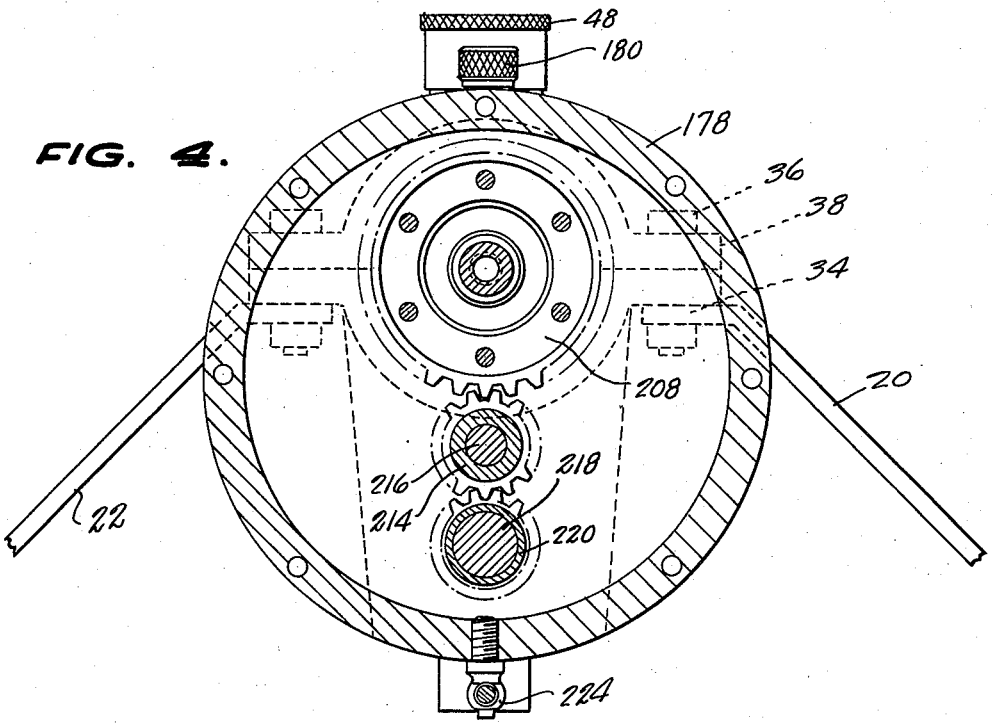
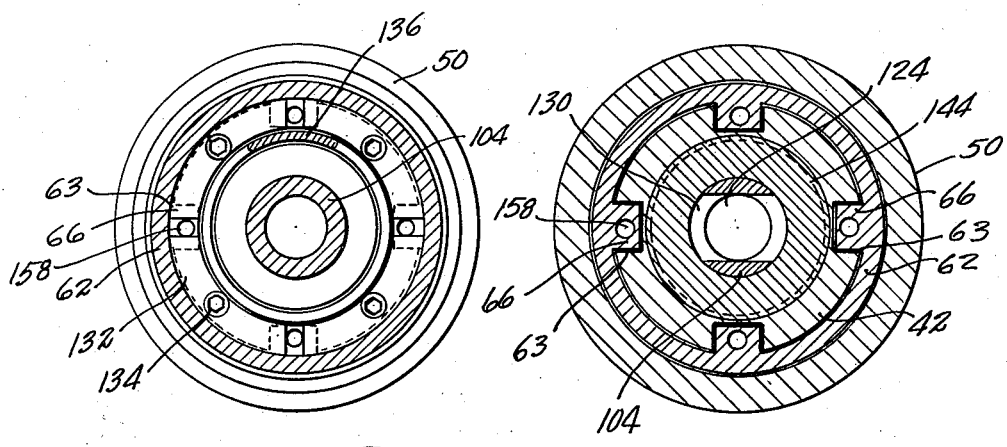
INVENTOR.
PASQUALE I. D'ANTINI,
BY
McMorrow, Berman + Davidson
ATTORNEYS.

Aug. 11, 1959 — P. I. D'ANTINI — 2,899,214
SAFETY ASSEMBLY FOR PROTECTING DRIVERS AND PASSENGERS OF AUTOMOTIVE VEHICLES
Filed Feb. 7, 1958 — 6 Sheets-Sheet 4

INVENTOR.
PASQUALE I. D'ANTINI,
BY
McMorrow, Berman & Davidson
ATTORNEYS.

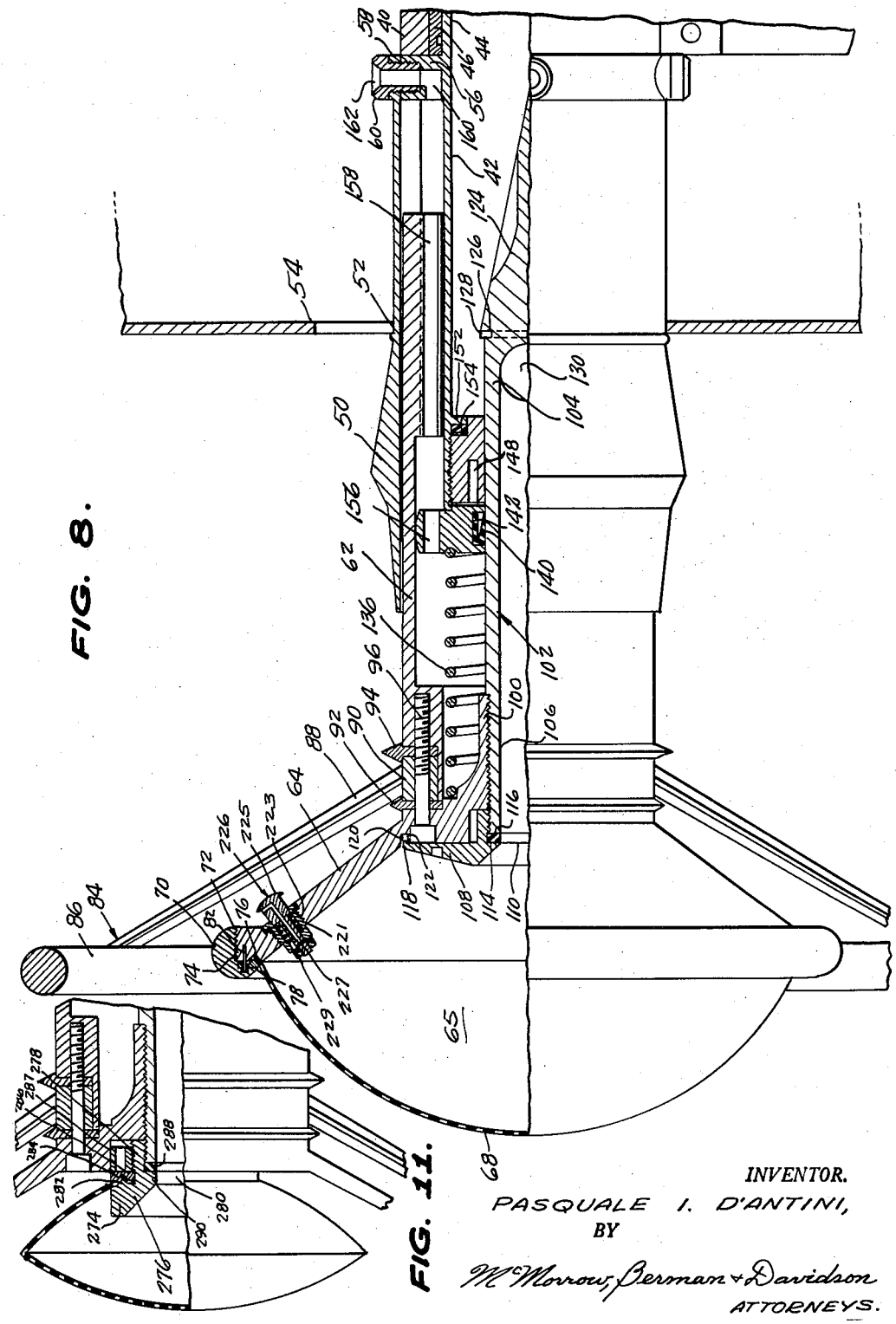

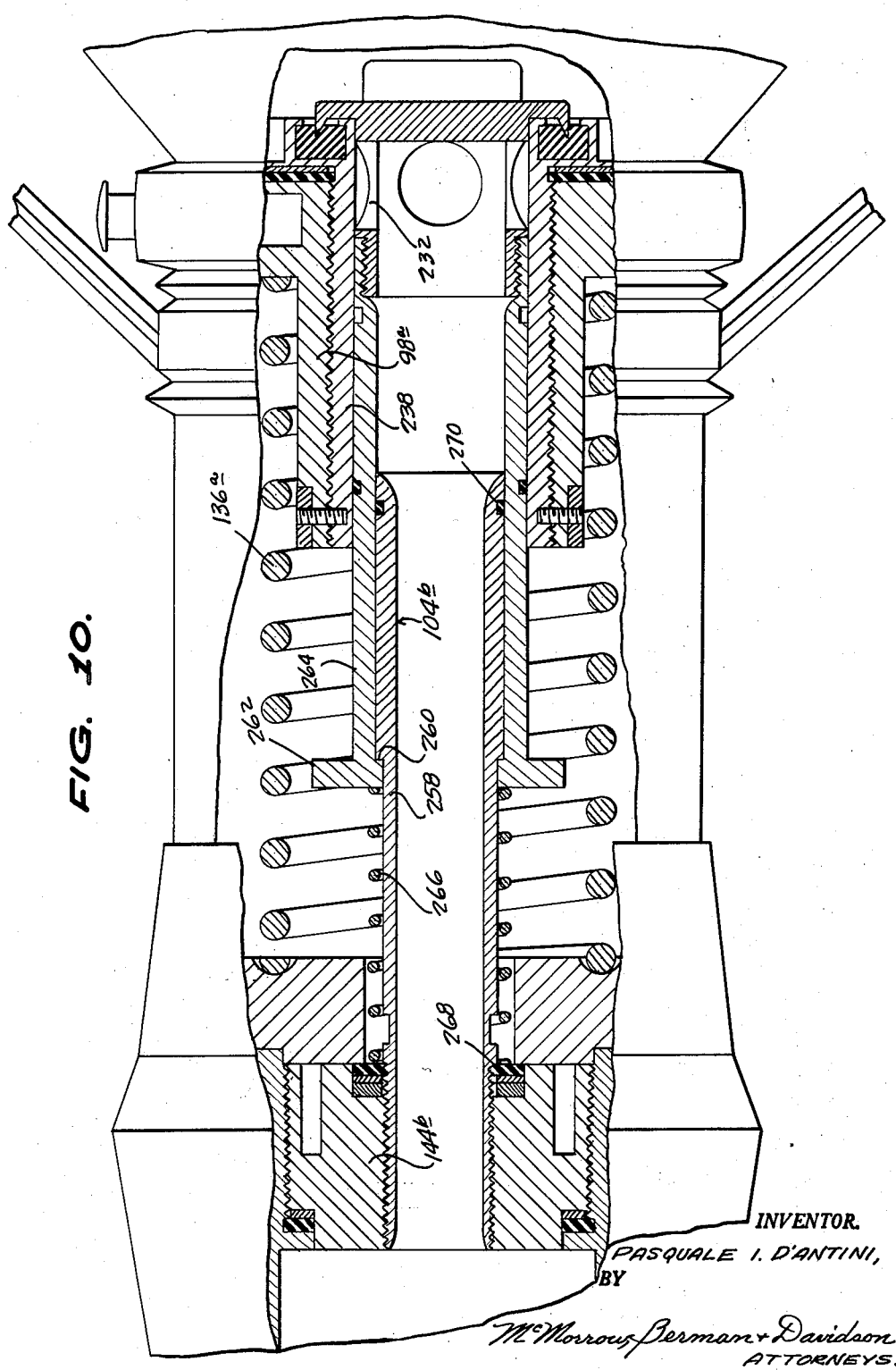

United States Patent Office 2,899,214
Patented Aug. 11, 1959

2,899,214

SAFETY ASSEMBLY FOR PROTECTING DRIVERS AND PASSENGERS OF AUTOMOTIVE VEHICLES

Pasquale I. D'Antini, Toronto, Ontario, Canada

Application February 7, 1958, Serial No. 713,816

15 Claims. (Cl. 280—87)

The present invention relates to safety devices for automotive vehicles and, more particularly, relates to an inflatable cushion assembly which is adapted to be positioned on the steering wheel to protect the driver of an automotive vehicle and which may also be mounted at various points on the dashboard so as to protect the passengers in the front seat of the vehicle, such inflatable safety means being automatically and instantaneously inflated upon the least forward movement of the steering wheel.

It is well known that many persons suffer death or serious injury, when involved in automobile collisions, because of the fact that their bodies are hurled forwardly against the steering wheel or against the dashboard or other unyielding structural portions of the vehicle. In particular, the driver of a vehicle is often seriously injured or fatally injured because of the fact that his chest is crushed against the steering wheel or his head is fractured upon impact with the steering wheel or the steering wheel post.

Various attempts have been made to provide safety cushion assemblies, one attempt being in the nature of an inflatable cushion assembly which is inflated upon deceleration of the vehicle, such deceleration actuating a normally stationary weight and causing it to shift and to open a valve which communicates a compressed air reservoir with the inflatable cushion assembly. Another attempt has been in the nature of foam rubber or felt matting material pads which have been mounted on the steering wheel and on the dashboard.

The present invention distinguishes from such prior attempts and possesses considerable advantages of construction and operation over such prior attempts because of the fact that the present invention provides an elastic inflatable cushion which is inflated by the least forward movement of the steering wheel what ever the cause or nature, that is, whether the movement is caused by the hands or any other part of the driver's body striking the wheel and whether it is deliberate or accidental on the part of the driver. The inflatable, elastic cushion is immediately inflated because the least forward movement of the steering wheel operates a valve means which places the interior of the cushion in direct contact with a chamber, which is a part of the steering post assembly and which contains a supply of compressed air. The cushion is inflated in accordance with the extent of the forward movement of the steering wheel and the period of time in which it is maintained in such forward position.

Because of the fact that the steering wheel operates a valve means which communicates the cushion on the steering wheel with a chamber which is part of the steering post construction, it can be appreciated that there is no time lag between the initial forward movement of the steering wheel and the inflation of the cushion. At the least forward movement of the steering wheel, the compressed air in the chamber is released with lightning speed into the cushion and causes an "explosive" inflation of the cushion which will assume a protective form on the steering wheel. The driver need scarcely make any forward movement in order to have at his disposal an elastic protection between the steering wheel and his chest or head. Thus, the basic characteristic of the present invention and the meritorious feature thereof resides in the provision of means for achieving the instantaneous and lightning quick creation of the elastic protection some time before the final impact.

The extent of the steering wheel forward movement or thrust is not limited to the initial, minimal movement, so there will be a continuation of the outflow of the compressed air from the chamber to the interior of the elastic cushion so as to increase the dimensions of the elastic protection. Thus, once the impact between the steering wheel and the driver occurs, the chest of the driver will strike against an elastic mass of a size proportionate to the extent or depth or thrust exerted on the steering wheel, that is to the outflow of air into the elastic cushion, which, in any case, will be formed and constructed so as to be of safety proportions regardless of its inflated size.

When the forward movement of the vehicle ceases, the steering wheel will retract and arrest the flow of air into the cushion. Of course, the flow can be arrested even before this if the driver's weight is released from the steering wheel, resilient means being provided for moving the steering wheel back to its original position with the valve means automatically closing as the steering wheel retracts to its original position.

Another important object of the present invention is to provide an inflatable cushion assembly for the steering wheel of a vehicle, such assembly being inflated by the use of valve means, which is actuated by the forward movement of the steering wheel, the valve means communicating the interior of the cushion with a compressed air chamber in the steering post. In this respect, the entire steering post construction is novel, in accordance with the present invention; being provided for the purpose of achieving the result of the invention. However, there is no interference with the conventional operation of the steering wheel, nor is there any increase in the size of the steering wheel assembly substantially beyond that of conventional steering wheel assemblies. The steering wheel is one complete assembly which unites the advantages of steering and safety.

Another important object of the present invention is to provide a safety cushion assembly wherein, if the original elastic cushion becomes fractured or, for any reason, must be replaced, a temporary replacement may be provided in the form of a conventional football, beach ball or the like inflatable object which, by the provision of structural means in accordance with the present invention, can be employed as a substitute for the elastic cushion.

The foregoing and ancillary objects are attained by this invention, the preferred embodiments of which are set forth in the following description and illustrated in the accompanying drawings, wherein:

Figure 3 is a longitudinal, vertical sectional view taken on the line 3—3 of Figure 1 and illustrating in detail the construction of the steering column and the safety means of the present invention;

Figure 4 is a transverse sectional view taken on line 4—4 of Figure 3 and showing the steering mechanism, that is, the steering gearing, in detail;

Figure 5 is a transverse sectional view taken on line 5—5 of Figure 3;

Figure 6 is a transverse sectional view taken on the line 6—6 of Figure 3;

Figure 8 is an enlarged longitudinal, vertical sectional view of the form of the present invention, shown in Figure 3, with the cushion inflated;

Figure 10 is an enlarged, detailed longitudinal vertical sectional view of a further modified form, such form being somewhat similar to that of Figure 9; and, Figure 11 is a fragmentary longitudinal sectional view showing the attachment, which is used to replace the elastic cushion with a temporary inflatable object, such as a football, beach ball or the like.

Figure 1:
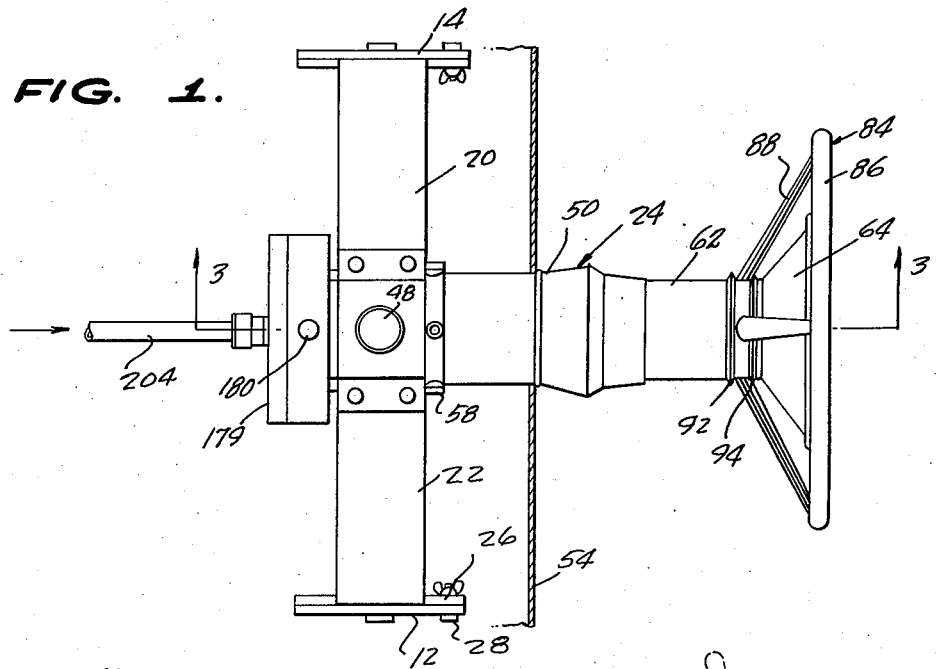
Figure 1 is a top plan view of the safety steering wheel assembly of the present invention.
Figure 2:
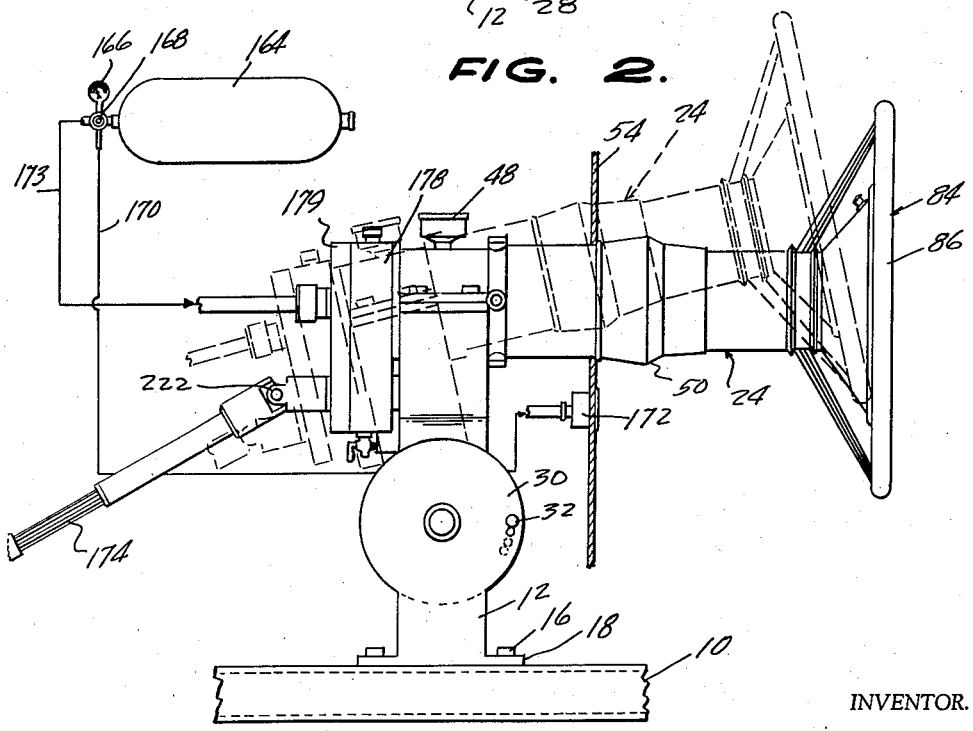
Figure 2 is a side elevational view thereof.

Referring now to the accompanying drawings, and initially to Figures 1–8, the reference numeral 10 generally designates a portion of the chassis of a conventional motor vehicle. Standards 12 and 14 upstand from the chassis in spaced apart, parallel and side-by-side relationship and are affixed to the chassis by bolts 16 which pass through the base mounting flanges 18 on the standards. Supporting arms 20 and 22 are carried by the standards and define a supporting base with the standards for the steering wheel assembly 24. The arms 20 and 22 project inwardly and upwardly from the standards and have circular flanges 26 which are attached to the upper circular ends of the standards by bolts 28. It is to be noted that the upper ends 30 of the standards are formed with a circumferentially extending and spaced series of openings 32 which are selectively alignable with the openings in the flanges 26 to receive the bolt means 28. In this fashion, it is possible to mount the steering wheel assembly 24 in a horizontal plane or in any desired angle relative to the horizontal, as illustrated in Figure 2.

The upper ends of the arms 20 and 22 are bent inwardly to form supporting flanges 34 which are fixed by bolts 36 to the fastening ears 38 of a split, ring-like housing 40.

The steering wheel assembly 24 is supported at one end by the fixed housing 40, which is fixedly supported by the supporting base. The steering wheel assembly 24 includes an elongated cylindrical tank 42, which forms a chamber for compressed air, as will be described. The outer end portion 44 of the tank is rotatably mounted in the housing 40 and rotates in a bronze bearing 46, which is disposed on the inner wall of the housing 40 and constitutes the bearing surface for the rotatable tank 42. A grease cup fitting 48 is secured to the top of the housing 40 so as to provide lubrication for the bearing 46, within which the tank 42 rotates.

A cylindrical cover member 50 forms the central, external portion of the steering wheel assembly and is positioned through an opening 52 in the dashboard 54, the opening being of a suitable vertical dimension so as to accommodate the desired angular positioning of the steering wheel assembly. The cover member 50 may be suitably designed and configured, especially that portion which is visible from the interior of the automotive vehicle.

The tank 42 is provided, intermediate its ends, with a series of circumferentially spaced and radially projecting internally threaded bosses 56 which coincide with shouldered openings 58 in the cover member 50 so as to receive screws 60 which secure the tank and cover member together in a fixed relationship and for common rotary movement.

A cylindrical drum 62 is slidably disposed within the cover member 50 and slides axially between the cover member and the inner end portion of the tank 42. In this respect, the outer wall of the tank 42 is formed with axially disposed grooves or slideways 63, which are circumferentially spaced, as shown in Figure 6, and which slidably receives tongues 66 that are formed in circumferentially spaced fashion on the inner wall of the drum 62. By such splined arrangement, the drum 62 can slide axially between the tank 42 and the cover 50 while being fast with such parts for common rotary movement.

The drum 62 terminates, at its inner end, in a truncated-conical end 64, which constitutes the fixed wall of the inflation chamber 65 and provides a support for the elastic covering 68.

The elastic covering 68 completely encloses the outer conical end 64 of the drum 62 and is secured to the end 64 by a ring 70. The outer edge of the end portion 64 is threaded, as at 72 and the inner wall of the ring 70 is threaded as at 74 so that the ring is threaded onto the end portion 64 of the drum. A V-shaped groove 76 extends around the end edge of the end portion 64 and receives a V-shaped tooth 78 which is formed on the overhanging flange 80 of the ring 70, with the edge portion of the covering 68 clamped by the engagement of the tooth 78 in the groove 76 and being held in place by pins 82.

A steering wheel 84 is provided and includes a circular rim portion 86 which is connected by spokes 88 to a hub 90. The hub is secured to the drum 62, along with ornamental rings 92 and 94, by screws 96, which also connect the hub portion 98 of the truncated-conical end portion 64 of the drum to the drum. Thus, as shown in Figure 3, the end portion 64 is a separate element from the drum 62 in order to provide a mounting means for the ornamental rings 92 and 94 and for the hub 90 of the steering wheel, with all the parts being secured together by the screws 96.

The hub portion 98 has an internally threaded cylindrical portion 100, which supports a valve means 102. The valve means 102 includes a sleeve 104, which has a threaded inner end 106 that is threaded into the threaded cylindrical portion 100 of the hub 98, with the end portion 106 extending beyond the cylindrical portion 100 and receiving a cap member 108. The cap member 108 is formed with a central aperture 110 that is in communication with the sleeve or tube 104. A cylindrical flange 112 extends forwardly from the cap member and is spaced radially from the central aperture 110. The cylindrical flange 112 is internally threaded and is screwed onto the projecting threaded end of the sleeve or tube 104. It is to be noted that the flange is spaced radially outwardly from the central aperture so as to provide a shoulder 114, which engages a resilient washer 116 and clamps the washer against the edge of the end portion 106 of the sleeve. The washer is provided to insure an air tight fit between the cap member 108 and the sleeve 104.

The cap member has a peripheral flange 118 which clamps a washer 120 against a shoulder 122 that is formed at the inner end of the truncated-conical end portion 64.

The sleeve or tube 104 terminates, at its inner end, in a solid end portion 124 which defines a shoulder 126 at its inner end, against which shoulder a washer 128 seats so as to insure that no air will escape from the tank 42 when the valve means is closed, as will be described.

The sleeve or tube 104 is formed with diametrically opposed, circular apertures 130, which are provided at its inner end, immediately inwardly of the solid inner end 124 and which establish the communication between the interior of the tank 42 and the inflatable chamber 65.

A ring 132 is fixed by screws 134, as shown in Figure 5, to the inner end of the tank 42, the screws being positioned between the grooves or slideways 63 and being disposed in spaced fashion so as to securely attach the ring 132 to the inner end of the tank 42. The inner wall of the ring 132 is formed with a groove 134, which constitutes a seat for a coil spring 136. The spring 136 has one end seated in the seat 134 and the other end bears against and is seated in a seat 138 that is formed in the hub portion 98 of the truncated-conical end portion of the drum 62.

The ring 132 has a circumferential groove 140 formed on its inner wall so as to accommodate a washer 142 which is provided to prevent the leakage of air from the tank 42 when the valve means 102 is open, as will be described.

An annular member 144 is disposed in front of the ring 132 and is threaded so as to fit in the internally threaded end 146 of the tank 42. To accommodate a tool, which is used in screwing the annular member 144 into the threaded end 146 of the tank 42, axial slots 148 are formed in the inner end of the annular member 144. The member 144 has an annular shoulder 150, which complements an inwardly directed annular flange 152 on the tank 42 so as to house a washer 154. The shoulder 126 of the closed end 124 of the sleeve or tube, which carries the washer 128, extends radially beyond the axial opening in the annular member 144. Thus, the member 144 constitutes a stop to limit the movement of the tube or sleeve 104, under the action of the spring 136. The tube or sleeve 104 is slidably disposed within the ring 132 and the annular member 144 with the washer means being provided to prevent any leakage of the compressed air from the tank 42 when the tube or sleeve is in its fully retracted position, under the spring action, so that the apertures 130 are not in communication with the interior of the tank 42.

In use, it can be seen that with the slightest pressure applied to the steering wheel 84, the tube or sleeve 104 will move forwardly in a rectilinear movement, with the drum 62 having its tongues 66 sliding in the grooves or slideways 63. A very slight forward movement of the steering wheel 84 will cause the openings or apertures 130 to be in immediate communication with the interior of the drum 42, within which a supply of compressed air is housed. The compressed air will be vented from the interior of the tank 42 through the openings 130 and the axial bore in the tube or sleeve 104 and will immediately fill the expansible chamber 65 so as to inflate the elastic covering 68. Regardless of the cause of the forward movement of the steering wheel, that is, whether it is produced by the hands of the operator of the automotive vehicle in a deliberate action or produced by contact of the body of the driver with the steering wheel, under an accidental action, the tube or sleeve 104 will slide forwardly and the elastic covering 68 will be inflated. This is true, irrespective of the nature of the contact, that is, whether it is voluntary or involuntary. Once there is any forward movement of the steering wheel, the openings 130 will be in communication with the interior of the tank 42 and the compressed air will flow through such openings and through the axial bore of the tube or sleeve 104 so as to inflate the elastic covering 68.

It is desired that the forward movement of the steering wheel will not meet with any resistance in the act of its being pushed forward because of air that may be contained in the drum 62. For this reason, axial openings 156 are formed in the ring 132 and are in alignment and communication with axial openings 158 that are formed in the tongues 66 of the drum 62. The openings 158 communicate with the slideways 63. Angular openings 160 are formed in the bosses 56 and axial openings 162 are formed in the screws 60.

Thus, any air contained within the drum 62 is evacuated through the aligned openings 156 and 158 and through the slideways or grooves 63 and through the openings 160 and 162, so that the interior of the drum 62 is vented to the atmosphere. This will prevent the steering wheel from meeting any resistance in the act of being pushed forward because of air that may be contained within the drum 62.

A compressed air tank 164 is provided and may be suitably mounted on the automotive vehicle. It is preferably proposed that the tank 164 be mounted on the chassis of the vehicle adjacent the motor block so that it will be disposed under the hood. The tank 164 is provided with a manometer 166 so that a service station attendant, when checking the oil and battery, will be able to service the tank 164 in the event that the manometer indicates that the air pressure is low. The fitting 168, to which the manometer 166 is connected, also has a line 170 attached thereto. The line 170 is connected to a manometer 172, which may be suitably mounted on the fire wall or dashboard of the automotive vehicle so that the operator of the vehicle can maintain a constant check on the air pressure existing in the pneumatic assembly. The fitting 168 also attaches a flexible tubing 173 to the steering wheel assembly so as to maintain a constant and complete air pressure in the tank 42 of the steering wheel assembly.

As has been previously described, the drum 62 is fastened by the spline connection to the tank 42 so that rotation of the steering wheel 84 will be transmitted by way of the drum 62 to the tank 42. The tank is connected to the steering shaft 174 by gearing 176, which is housed within a gear box 178. The gear box 178 is annular and has a screw fitting 180 provided in the top thereof so as to provide means for placing lubricating oil within the gear box 178.

The gear box 178 is provided with a cover 179 which is affixed thereto by screws 182. The housing 40 has a depending flange portion 184 which is secured by screws 186 to the gear box and supports the gear box in a fixed position to the outer end of the housing. An opening 188 is formed in the gear box to accommodate the extending end 190 of the tank 42. The extending end has an outwardly projecting annular flange 192 that is interposed between the gear box and the housing 40 and is rotatable relative thereto. The extending end 190 is internally threaded to receive a fitting portion 194, which is screw fitted therein and which has a shoulder that is arranged complemental to a shoulder on the portion 190 so as to house a washer 196, which prevents the leakage of air from the tank 42. The fitting 194 has an extending, stepped throat portion 198, over which the internally stepped end portion of a pipe 200 is fitted and to which it is secured, with ball bearings 202 being provided, since the pipe 200 is fixed, while the fitting 194 rotates with the tank 42. The pipe 200 extends through a suitable opening in the cover 179 of the gear box and receives a flexible tubing 204 which is affixed thereto by a connection 206. The flexible tubing 204 is connected to the tubing 174 or may be integral therewith, thereby supplying the communication from the storage tank 164 to the tank 42.

A gear 208 is secured to the extending end portion 190 of the tank 42 by screws 210, which also secure a thrust bearing 212, the thrust bearing being disposed on the opposite side of the gear 208 from the end portion 190 and serving to locate the gear 208 and to prevent the fitting 194 from becoming unscrewed since the thrust washer 212 is secured by the screws 210 in relationship with the gear 208 and disposed in such relationship to prevent any relative rotation of the fitting 194.

An intermediate gear 214 is mounted on a stub shaft 216 which is disposed within the gear box, with the gear 214 in meshing engagement with a gear 218 that is fixedly circumposed by suitable means on the shaft 220. The shaft 220 is connected by a universal joint 222 to the steering shaft 174.

Thus, rotation of the steering wheel is transmitted through the drum 62 and the tank 42 to the gear 208 and through the intermediate gear 214 to the gear 218 on the shaft 220. Any rotary movement of the shaft 220 is transmitted through the universal joint 222 to the steering shaft 174.

By removing the screw 180, lubricating oil may be poured into the gear box 178, while the gear box may be emptied by means of the tap 224 which is provided on the underside of the gear box.

When the steering wheel is forced forwardly, under a minimum pressure, the apertures 130 are in direct communication with the interior of the tank 42 to inflate the elastic coverings 68. After the emergency has passed and it is desired to deflate the elastic covering 68, valve means 226 is provided for such purpose. The valve means 226 is mounted in the end portion 64 of the drum 62 and can be manually operated by finger pressure so as to vent the inflatable chamber 65 to the atmosphere. The valve means includes a bored plug 221 which is threaded in a threaded aperture 223 in the wall of the end portion 64 and a screw 225 which is slidable in the bore of the plug and has an angular bore 227 to communicate the chamber 65 with the atmosphere. Spring means 229 retains the screw in a normally closed position.

Figure 9:
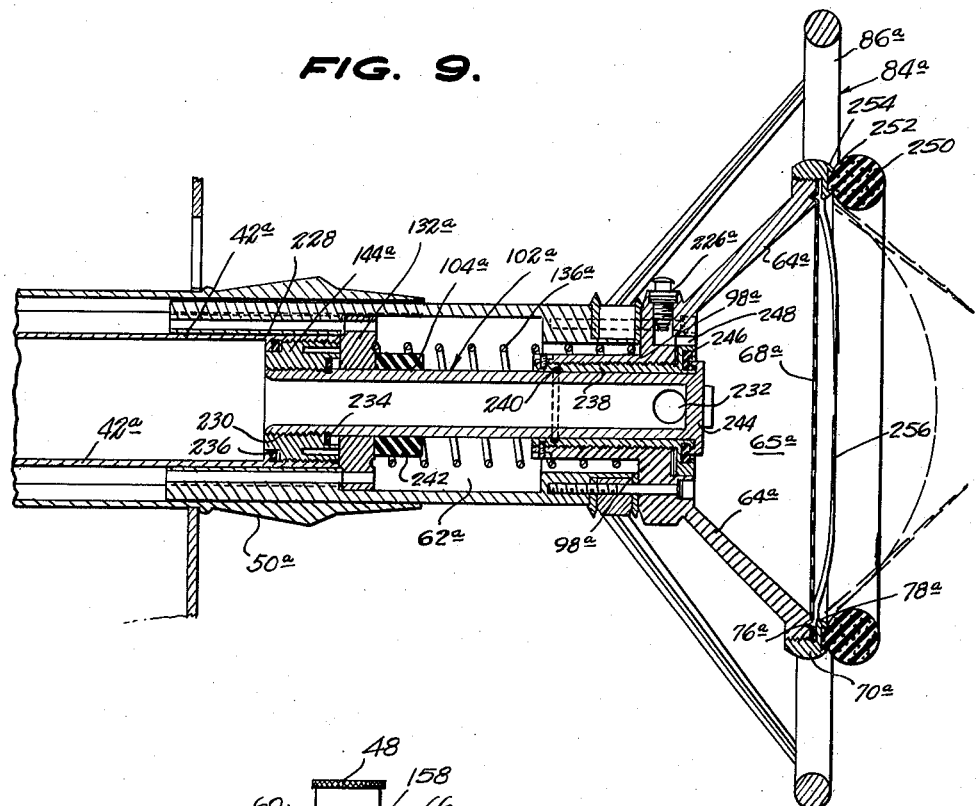
Figure 9 is a longitudinal vertical sectional view of another form of the present invention.
Figure 7:
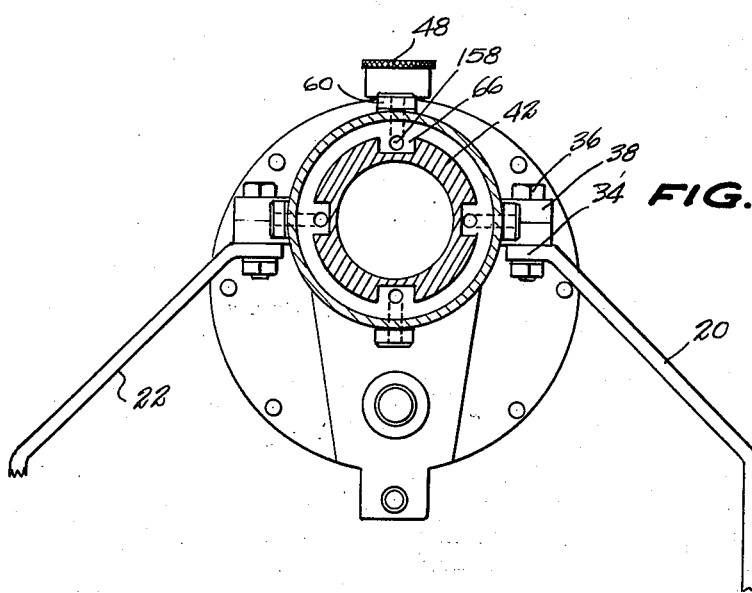
Figure 7 is a transverse sectional view taken on the line 7—7 of Figure 3.

In the embodiment of Figures 1–8, the tube or sleeve 104 of the valve means 102 must be moved into the tank 42 in order to communicate the apertures 130 with the interior of the tank and thereby fill the tube with the compressed air so as to fill the inflatable chamber 65 with the air and, consequently, inflate the elastic covering 68. While such structure permits an instantaneous inflation of the covering 68, it may be desired that a more immediate inflation be obtained. In order to accomplish this result, the form of the invention, which is shown in Figure 9, is provided. In this embodiment, the valve means 102A consists of the sleeve or tube 104A which has an open inner end 228 that is in constant communication with the interior of the tank 42A.

The outer end portion of the tube or sleeve 104A is externally threaded and is secured to the inner threaded wall 230 of the annular member 144A. The ring 132A is mounted in place in the same manner as the ring 132 and the openings are provided for venting the interior 62A to the atmosphere. However, it is to be noted that the tube or sleeve 104A is fixed to the tank 42A and is not movable, in a linear or axial direction, relative thereto. Instead, the drum 62A slides relative to the sleeve or tube 104A and also moves axially relative to the drum 42A and the cover 50A, which latter movement is the same as that in the embodiment of Figures 1–8. The sleeve or tube 104A is formed, adjacent its inner ends, with radial openings 232A, which communicate with the inflatable chamber 65A, when the drum 62A is moved forwardly upon the slightest exertion on the steering wheel 84A.

As can be seen, resilient washers 234 and 236 are suitably provided and clamped between complemental shoulders on the annular part 144A, the tank 42A and the tube 104A so as to provide an air tight connection between the annular part 144A and the tube 104A. In this regard, an annular member 238 is circumposed on the inner end of the tube for reinforcing the tube and is provided with washer means 240, which is in the form of a rubber ring that is placed on the tube 104A and retains the air between the tube and the annual member 238. The outer surface of the member 238 is threaded so as to be in screw tight engagement with the inner threaded wall of the hub portion 98A of the end portion 64A of the drum 62A. The member 238 slides on the sleeve or tube 104A so as to dispose the apertures 232 in direct communication with the inflatable chamber 65A. The forward sliding movement of the hub portion 98A and part 238 is limited by the elastic bumper ring 242 which abuts against the ring 132A. The coil spring 136A which bears between the ring 132A and the hub portion 98A is provided to return the steering wheel and the hub portion 98A to its normal position wherein the hub portion, that is, particularly the part 238A closes off the apertures 232.

In order to prevent the admission of air into the chamber 65A when the apertures 232 are closed, a cap member 244 is provided and is secured within the inner end of the part 238 and is provided so that the inner end of the sleeve 102A abuts it in its normal position. Sealing means 246 is carried by the enlarged inner end of the part 238 and is engaged by the peripheral flange on the cap member 244 so as to provide an air tight seal.

The hub portion 98A is formed with a right angular bore 248, the lateral leg of which houses the valve means 226A, whereby the chamber 65A may be vented to the atmosphere when it is desired to deflate the elastic covering 68A.

In use, any forward pressure, regardless of how slight, which is imparted to the steering wheel 84A, will cause the apertures 232 to be immediately uncovered since such pressure will move the hub portion 98A and the part 238A forwardly, thereby uncovering the apertures 232. It is to be particularly noted that the tube or sleeve 104A, which is in constant and direct communication with the interior of the tank 42A, will always be filled with compressed air. Therefore, an instantaneous and "explosive" filling of the inflation chamber 65A will take place. This will mean a very instantaneous inflation of the covering 68A. In this respect, it will also be noted that the outflow of the air from the tube or sleeve will be in a radial direction, as opposed to the axial direction of the form in Figures 1–8. Because of this feature, the center of the protective elastic covering will not be subjected to the direct pressure of the air flow and will not be subjected to dilation which may occur if the elastic covering receives the flow frontally.

A further feature of the present invention is shown in connection with the form of Figure 9, though such feature may be incorporated as a part of the other forms of the present invention. In this regard, an elastic ring or annulus 250, which may be formed from sponge rubber or other suitable sturdy and elastic material is provided. The ring 250 has a dove-tailed base tongue 252, which is fitted in a dove-tailed slot 254 that is formed in the outer lateral end wall of the ring 70A. The elastic ring projects rearwardly beyond the steering wheel hub 86A and is provided to protect the driver from the least injury if the driver should strike the wheel with his chest immediately previous to the inflation of the elastic covering 68A. The elastic ring 250 is provided, with the utmost of caution in mind, since the elastic covering 68A will respond to the slightest movement of the steering wheel and provide an instantaneous inflation of the covering 68A for the protection of the body and head of the driver. However, in an instinct of utmost caution, the elastic ring 250 is provided to positively insure against any injury to the chest of the driver.

In connection with the form of Figure 9, another feature is shown, which feature may be used in connection with the various other embodiments of the present invention. Such feature consists of the provision of ornamental segmental sections 256, which are affixed by the tongue and groove means 76A and 78A to the outer end of the end portion 64A, along with the securement of the peripheral edge portion of the elastic covering 68A. Segmental portions 256, which may be variously designed and which radiate from the outer edge of the end portion 64A to overlie the elastic covering 68A in a decorative fashion, are formed from suitable elastic material, such as rubber or plastic, so as to fold outwardly when the elastic covering 68A is expanded and to return to their normal position, as shown in Figure 9, when the covering 68A is deflated upon the venting of the chamber 65A to the atmosphere through the valve means 226A.

In the form of Figure 10, a reduction in the axial extent of the valve means 102A is realized by forming the tube or sleeve 104B in two parts which are telescopically disposed. Thus, there is an inner part 258, which is fixed to the annular member 144B, similar to the fixing of the tube 104A to the part 144A. The inner tube 258 has an external annular shoulder 260 which the inner flange 262 of the outer tube or sleeve 264 abuts in its rearward direction so as to limit the rearward movement of such outer tube part 264.

The operation of the structure of Figure 10 is simlar to the operation of Figure 9 in that when the steering wheel is pushed forwardly, under the slightest exertion, the part 238 slides on the outer tube 264 along with the hub 98A, thereby exposing the apertures 232 and immediately filling the inflatable cavity chamber 65A with compressed air so as to inflate the elastic covering 68A. Meanwhile, the part 264 does not move because it is opposed by the weak spring 266, so that the part 238 and the hub 98A freely slide on the tube 264 until they engage the flange 262. When the part 238 and the hub portion 98A abut the flange 262, the outer tube part 264 slides on the inner part 258 and this results in the desired reduction in length of the tube 104B. The hub portion 98A and the part 238 are returned to their normal position by the spring 136A, while a spring 266 is provided for returning the outer tube part 264 to its normal position, the spring bearing against the flange 262 and against a shoulder 268, which is carried by the outer end portion of the fixed inner tube part 258. As can be seen, the sliding parts are provided with rings 270 so as to prevent the leakage of air.

As shown in Figure 11, an improvised cushion 272 may be used in the event that the elastic covering 68 becomes fractured or otherwise is malfunctioning. In such event, the elastic covering 68 is removed and the improvised inflatable cushion 272 may be attached, such cushion being of the foot ball, beach ball or the like well known and conventional type. In using the improvised cushion 272, the elastic covering 68 is cut away so as to expose the opening 110 and the outer end portion 106 of the sleeve 104 of the valve means 102.

A hole of sufficient depth is formed in the improvised cushion 272 to receive the enlarged head 274 of a fitting 276, which has a cylindrical body portion 278. The cylindrical body portion 278 is externally and internally threaded and is provided with an aperture 280 that coincides with the bore of the sleeve 104. The enlarged head 274 is formed with a tapered bore that constitutes the mouth of the bore 280. The inner end wall of the head 274 is formed with a tooth 282 which mates with a circular groove 284 that is formed in a ring 286. The tooth and groove cooperate to secure the bounding edge portion of the cushion 272, that is, the portion around the opening formed therein. Thus, the head and the ring clamp on the ring on the inflatable cushion 272. A ring 287 is threaded onto the outside of the body portion 278, which is threaded onto the extending end of the end portion 106 of the tube 104, with a suitable washer 288 being interposed between the end edge of the end portion 106 and the shoulder 290 on the enlarged end 274 of the fitting.

In this way, any conventional type of inflatable body, such as a foot ball, beach ball or the like, may be used for the purpose of providing the elastic cushion in the event that the elastic covering 68 becomes ruptured or otherwise must be replaced.

This attachment may be used in connection with all of forms of the present invention and is provided as a safety measure in conjunction with the various forms of the present invention in order to enable an emergency repair to be made whereby the safety provisions of the present invention may be realized even though the elastic covering 68 has been ruptured.

In connection with the purpose and use of the present invention, it is to be understood that suitable means may be provided whereby the valve actuating forward movement of the steering wheel will not only serve to inflate the inflatable cushion on the steering wheel but will also serve to inflate other inflatable cushions which may be attached to the dashboard or to other parts of the vehicle.

Thus, it is to be understood that while the best known forms of the present invention have been described and illustrated herein, other forms may be realized, as come within the scope of the appended claims.

Having thus described this invention what is claimed is:

1. A safety cushion assembly for automotive vehicles, comprising an inflatable cushion means adapted for mounting within an automotive vehicle, a steering wheel assembly including a steering wheel, a chamber for compressed air, means mounting the steering wheel assembly for rotary movement to operate the steerable road wheels, means mounting the steering wheel for forward movement and valve means actuated by the forward movement of the steering wheel of the assembly for communicating the compressed air chamber with the inflatable cushion means whereby the cushion means is inflated upon any forward movement of the steering wheel.

2. A safety assembly for protecting drivers and passengers of automotive vehicles comprising an inflatable cushion means which is adapted to be mounted within a vehicle, a steering wheel assembly including a steering wheel, a chamber for compressed air, means mounting the steering wheel assembly for rotary movement to operate the steerable road wheels, means mounting the steering wheel for forward movement and valve means reactive to a forward movement of the steering wheel for communicating the chamber with the cushion means whereby the cushion means is automatically inflated upon any forward movement of the steering wheel.

3. An automotive steering wheel assembly comprising a steering column which includes a chamber for compressed air and a steering wheel, an inflatable cushion means overlying the steering wheel, means mounting said steering wheel for forward movement and for rotary movement, means reactive to the rotary movement for steering the steerable road wheels of the vehicle and valve means reactive to the forward movement of the steering wheel for communicating the chamber with the cushion means so as to inflate the cushion means to a position protruding beyond the steering wheel.

4. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion.

5. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said supporting means including inner and outer tubular members, the inner member having an axial bore that communicates the tank with the interior of the cushion when the valve means is open.

6. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said supporting means including inner and outer tubular members, the inner member having an axial bore that communicates the tank with the interior of the cushion when the valve means is open, said tank having a fixed inner bearing ring through which the inner tube slides and said inner tube having apertures on its inner end that constitutes the valve means.

7. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said supporting means including inner and outer tubular members, the inner member having an axial bore that communicates the tank with the interior of the cushion when the valve means is open, said tank having a fixed inner bearing ring through which the inner tube slides and said inner tube having apertures on its inner end that constitutes the valve means, and stop means on the inner tube and bearing ring to locate the steering wheel in its normal position.

8. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said supporting means including inner and outer tubular members, the inner member having an axial bore that communicates the tank with the interior of the cushion when the valve means is open, said tank having a fixed inner bearing ring through which the inner tube slides and said inner tube having apertures on its inner end that constitutes the valve means, and stop means on the inner tube and bearing ring to locate the steering wheel in its normal position, and spring means between the bearing ring and the steering wheel to return the wheel to its normal position and close off the apertures.

9. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said cushion including an elastic covering, a fixed conical wall on the wheel supporting means to the major end of which the covering is attached to enclose said end.

10. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, means supporting the wheel and connected for rotation with the tank and slidable axially relative to the tank upon a forward pressure on the wheel and valve means actuated by the wheel-supporting means to communicate the tank with the interior of the cushion, said cushion including an elastic covering, a fixed conical wall on the wheel supporting means to the major end of which the covering is attached to enclose said end, said conical wall having a free end edge, a ring secured to said edge, and tongue and groove means on the free end edge and the ring to clamp the elastic covering in place.

11. A safety steering wheel assembly comprising a supporting means adapted to be mounted on the chassis of an automotive vehicle, a cylindrical tank rotatably supported by the supporting means, means actuated by the tank and adapted to be connected to the steerable road wheel linkage for turning the steering wheels of the vehicle when the tank is rotated, a steering wheel, means supporting the steering wheel on the tank with the steering wheel being connected to the tank for rotation therewith and for axial sliding movement relative thereto, an elastic cushion overlying the steering wheel and means responsive to a forward sliding movement of the steering wheel for communicating the tank with the interior of the cushion to inflate the cushion.

12. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, a hollow drum carrying the steering wheel on its outer end and slidable at its inner end on the tank, means connecting the drum and the tank for rotation, and valve means actuated by the forward sliding movement of the drum under pressure exerted on the steering wheel to communicate the tank through the drum with the cushion.

13. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, a hollow drum carrying the steering wheel on its outer end and slidable at its inner end on the tank, means connecting the drum and the tank for rotation, and valve means actuated by the forward sliding movement of the drum under pressure exerted on the steering wheel to communicate the tank through the drum with the cushion, said last means including a ring means transversely fixed in the tank, a tube coaxially disposed within the drum and slidable in the ring means and having a closed inner end and an open outer end extending into the interior of the cushion and communicating with the cushion, said tube having side openings adjacent its closed end to communicate the tank with the cushion when the steering wheel pushes the tube and drum forwardly.

14. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, a hollow drum carrying the steering wheel on its outer end and slidable at its inner end on the tank, means connecting the drum and the tank for rotation, and valve means actuated by the forward sliding movement of the drum under pressure exerted on the steering wheel to communicate the tank through the drum with the cushion, said last means including a tube fixed to the interior of the tank and disposed coaxially in the drum, said tube having an open outer end and a closed inner end at the interior of the cushion, said tube having openings in its side wall adjacent its outer end and a ring means carried by the interior of the drum and slidable on the tube to expose the openings when the drum and steering wheel are moved forwardly.

15. An automobile safety steering wheel assembly comprising a support adapted to be attached to the chassis of a vehicle, a tank rotatably carried by the support and adapted to contain a supply of compressed air, means connecting the tank to the steerable road wheels of the vehicle so that rotation of the tank will effect a turning of the wheels, a steering wheel, an inflatable cushion overlying the wheel and adapted to be expanded by the compressed air so as to provide an elastic mass which bulges out from the wheel, a hollow drum carrying the steering wheel on its outer end and slidable at its inner end on the tank, means connecting the drum and the tank for rotation, and valve means actuated by the forward sliding movement of the drum under pressure exerted on the steering wheel to communicate the tank through the drum with the cushion, said last means including a tube fixed to the interior of the tank and disposed coaxially in the drum, said tube having an open outer end and a closed inner end at the interior of the cushion, said tube having openings in its side wall adjacent its outer end and a ring means carried by the interior of the drum and slidable on the tube to expose the openings when the drum and steering wheel are moved forwardly, said tube having telescopic sections.

References Cited in the file of this patent
UNITED STATES PATENTS 2,649,311     Hetrick  ---------------  Aug. 18, 1953